(12) United States Patent
Chiang et al.

(10) Patent No.: US 11,364,972 B2
(45) Date of Patent: Jun. 21, 2022

(54) FIXING ASSEMBLY FOR BICYCLE REAR DERAILLEUR

(71) Applicant: TEKTRO TECHNOLOGY CORPORATION, Changhua County (TW)

(72) Inventors: Yen Hui Chiang, Changhua County (TW); John L. Calendrille, Jr., Port Jefferson, NY (US)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 252 days.

(21) Appl. No.: 16/695,828

(22) Filed: Nov. 26, 2019

(65) Prior Publication Data
US 2020/0255090 A1 Aug. 13, 2020

(30) Foreign Application Priority Data
Feb. 13, 2019 (TW) .................................. 10810474.6

(51) Int. Cl.
*B62M 9/125* (2010.01)

(52) U.S. Cl.
CPC .................................. *B62M 9/125* (2013.01)

(58) Field of Classification Search
CPC ...... B62M 9/125; B62M 9/126; B62M 9/121; B62M 9/124; B62M 9/1242; B62M 9/1244; B62M 2009/12406; B62M 2009/12413; B62M 9/135; B62M 9/136
USPC .......................................................... 474/80
See application file for complete search history.

(56) References Cited

U.S. PATENT DOCUMENTS

| | | | | |
|---|---|---|---|---|
| 4,494,944 | A * | 1/1985 | Coue ...................... | B62M 9/125 280/238 |
| 4,637,809 | A * | 1/1987 | Nagano ................ | B62M 9/1248 474/82 |
| 4,690,663 | A * | 9/1987 | Nagano .................. | B62M 9/125 474/80 |
| 4,850,940 | A * | 7/1989 | Nagano .................. | B62M 9/126 474/82 |
| 4,906,036 | A * | 3/1990 | James ................. | E05B 63/0056 292/DIG. 60 |
| 5,498,211 | A * | 3/1996 | Hsu ...................... | B62M 9/1248 74/473.13 |

(Continued)

*Primary Examiner* — Michael R Mansen
*Assistant Examiner* — Raveen J Dias
(74) *Attorney, Agent, or Firm* — Locke Lord LLP; Tim Tingkang Xia, Esq.

(57) ABSTRACT

The disclosure provides a fixing assembly for a bicycle rear derailleur including a mount seat, a fastener, a resistance applying component and a resistance controlling component. The mount seat has a through hole and an annular inner surface forming the through hole. The fastener is disposed through the through hole. The fastener has a threaded portion and a recess. The threaded portion is configured to be screwed into a bicycle frame to fix the mount seat. The resistance applying component is disposed on the fastener and located between the annular inner surface and the recess. The resistance controlling component is disposed on the recess of the fastener, and the resistance controlling component is movable towards the threaded portion along an axial direction of the fastener so as to force the resistance applying component to radially move outwards to press against the annular inner surface of the mount seat.

22 Claims, 13 Drawing Sheets

(56) References Cited

U.S. PATENT DOCUMENTS

| | | | | |
|---|---|---|---|---|
| 5,836,844 A * | 11/1998 | Yoshida | | B62M 9/125 411/539 |
| 5,961,409 A * | 10/1999 | Ando | | B62M 9/1244 474/82 |
| 6,350,212 B1 * | 2/2002 | Campagnolo | | B62M 9/126 474/82 |
| 6,394,921 B1 * | 5/2002 | Fukuda | | B62M 9/126 474/82 |
| 7,572,199 B1 * | 8/2009 | Calendrille, Jr. | | B62M 9/125 474/82 |
| 11,230,350 B2 * | 1/2022 | Braedt | | B62M 9/121 |
| 2004/0110586 A1 * | 6/2004 | Shahana | | B62J 23/00 474/80 |
| 2004/0116222 A1 * | 6/2004 | Shahana | | B62M 9/125 474/82 |
| 2006/0058135 A1 * | 3/2006 | Shahana | | B62M 9/125 474/82 |
| 2006/0172831 A1 * | 8/2006 | Wen | | B62M 9/128 474/82 |
| 2006/0194660 A1 * | 8/2006 | Shahana | | B62M 9/12 474/82 |
| 2008/0064544 A1 * | 3/2008 | Yamaguchi | | B62M 9/125 474/82 |
| 2010/0004079 A1 * | 1/2010 | Watarai | | B62M 9/125 474/135 |
| 2014/0018199 A1 * | 1/2014 | Shahana | | B62M 9/126 474/82 |
| 2015/0148159 A1 * | 5/2015 | Rosati | | B62M 9/1248 474/117 |
| 2018/0170481 A1 * | 6/2018 | Pasqua | | B62M 9/1246 |
| 2018/0265169 A1 * | 9/2018 | Braedt | | B62M 9/125 |
| 2018/0346068 A1 * | 12/2018 | Calendrille, Jr. | | B62M 9/124 |
| 2019/0016411 A1 * | 1/2019 | Ueda | | B62M 25/02 |
| 2019/0322333 A1 * | 10/2019 | Braedt | | B62M 9/125 |
| 2020/0130779 A1 * | 4/2020 | Ma | | B62M 9/1248 |
| 2020/0198728 A1 * | 6/2020 | Braedt | | B62M 9/125 |
| 2020/0298933 A1 * | 9/2020 | Braedt | | B62M 9/1242 |
| 2021/0188396 A1 * | 6/2021 | Braedt | | B62K 25/02 |
| 2021/0339822 A1 * | 11/2021 | Roman | | B62M 9/125 |
| 2021/0371047 A1 * | 12/2021 | Tsai | | B62M 9/126 |

* cited by examiner

FIXING ASSEMBLY FOR BICYCLE REAR DERAILLEUR

CROSS-REFERENCE TO RELATED APPLICATIONS

This non-provisional application claims priority under 35 U.S.C. § 119(a) on Patent Application No(s). 108104746 filed in Taiwan, R.O.C. on Feb. 13, 2019, the entire contents of which are hereby incorporated by reference.

TECHNICAL FIELD

The disclosure relates to a fixing assembly for a bicycle rear derailleur, particularly to a fixing assembly having a resistance applying component and a resistance controlling component.

BACKGROUND

In recent years, road bikes, mountain bikes and other types of bicycles are all popular in the market, and it motivates bicycle manufacturers to pay more attention on improving their products. Generally, a bicycle has front chainrings on an output shaft and rear cassette on a rear wheel hub, and there is a chain wrapped around the front chainrings and the rear cassette. When a rider pedals the bicycle to rotate the front chainrings, the front chainrings can drive the rear cassette to rotate through the chain so as to move the bicycle. Moreover, the bicycle is usually provided with derailleurs to switch the position of the chain. In detail, there are a front derailleur and a rear derailleur; the front derailleur is configured to move the chain among the front chainrings, and a rear derailleur is configured to move the chain among the rear cassette. By using the front derailleur and the rear derailleur to switch the position of the chain, the gear ratio between the front chainrings and the rear cassette can be changed.

SUMMARY OF THE INVENTION

One embodiment of the disclosure provides a fixing assembly for a bicycle rear derailleur. The fixing assembly is adapted to be mounted on a bicycle frame. The fixing assembly includes a mount seat, a fastener, at least one resistance applying component and a resistance controlling component. The mount seat has a through hole and an annular inner surface forming the through hole. The fastener is disposed through the through hole of the mount seat. The fastener has a threaded portion and a recess. The threaded portion is configured to be screwed into the bicycle frame to fix the mount seat on the bicycle frame, and the recess of the fastener and the through hole of the mount seat extend along a same direction. The resistance applying component is movably disposed on the fastener and located between the annular inner surface of the mount seat and the recess of the fastener. The resistance controlling component is movably disposed on the recess of the fastener, and the resistance controlling component is movable towards the threaded portion of the fastener along an axial direction of the fastener so as to force the resistance applying component to radially move outwards to press against the annular inner surface of the mount seat.

Another embodiment of the disclosure provides a fixing assembly for a bicycle rear derailleur. The fixing assembly is adapted to be mounted on a bicycle frame. The fixing assembly includes a mount seat, a fastener, a first resistance applying component and a resistance controlling component. The fastener is disposed through the mount seat. An end of the fastener is configured to be screwed into the bicycle frame to fix the mount seat on the bicycle frame. The fastener has an outer surface. The first resistance applying component is movably disposed on the mount seat. The first resistance applying component has a screw hole. The resistance controlling component is disposed through the mount seat. The resistance controlling component comprises a threaded portion mating with the screw hole. The resistance controlling component is rotatable to move the first resistance applying component to press against the outer surface of the fastener or away from the outer surface of the fastener.

Still another embodiment of the disclosure provides a fixing assembly for a bicycle rear derailleur. The fixing assembly is adapted to be mounted on a bicycle frame. The fixing assembly includes a mount seat, a fastener, a plurality of resistance applying components and a resistance controlling component. The mount seat has a through hole and an annular inner surface forming the through hole. The fastener is disposed through the through hole of the mount seat. The fastener has a threaded portion, and the threaded portion is configured to be screwed into the bicycle frame to fix the mount seat on the bicycle frame. The resistance applying components are connected to an end of the fastener, away from the threaded portion of the fastener, in an axial direction of the fastener. The resistance applying components together form a recess therebetween, and the resistance applying components are located between the annular inner surface of the mount seat and the recess. The resistance controlling component is movably disposed in the recess, and the resistance controlling component is movable towards the threaded portion of the fastener along the axial direction of the fastener so as to force the plurality of resistance applying components to radially move outwards to press against the annular inner surface of the mount seat.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
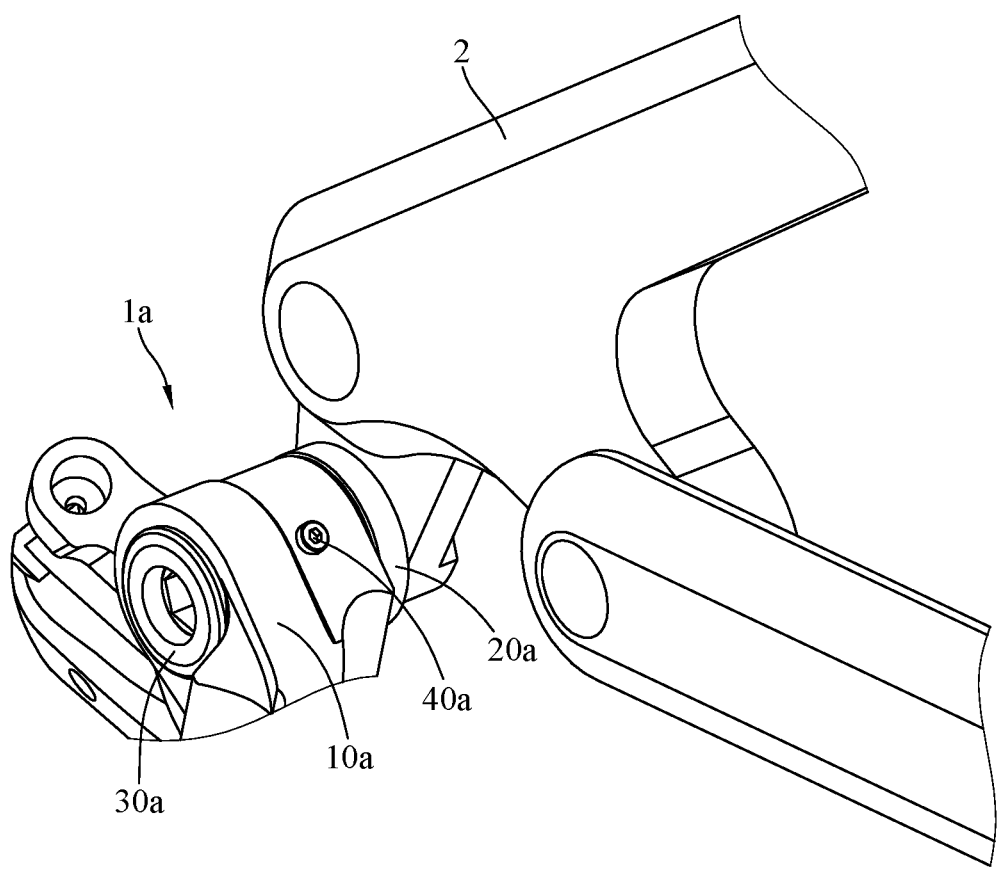
FIG. 1 is a partial enlarged perspective view of a fixing assembly and a bicycle frame according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
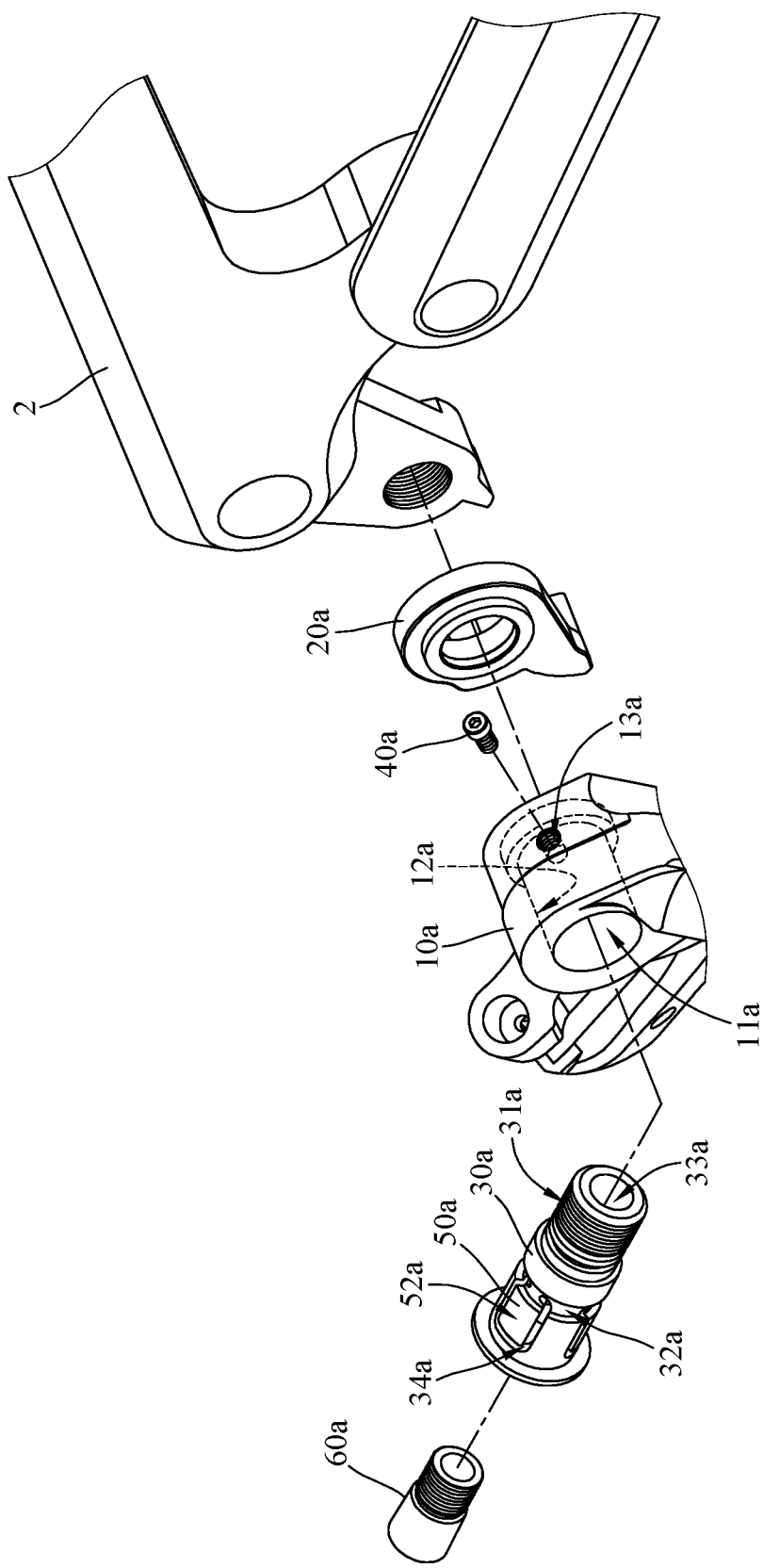
FIG. 2 is an exploded view of the fixing assembly and the bicycle frame in FIG. 1.
Figure 3:
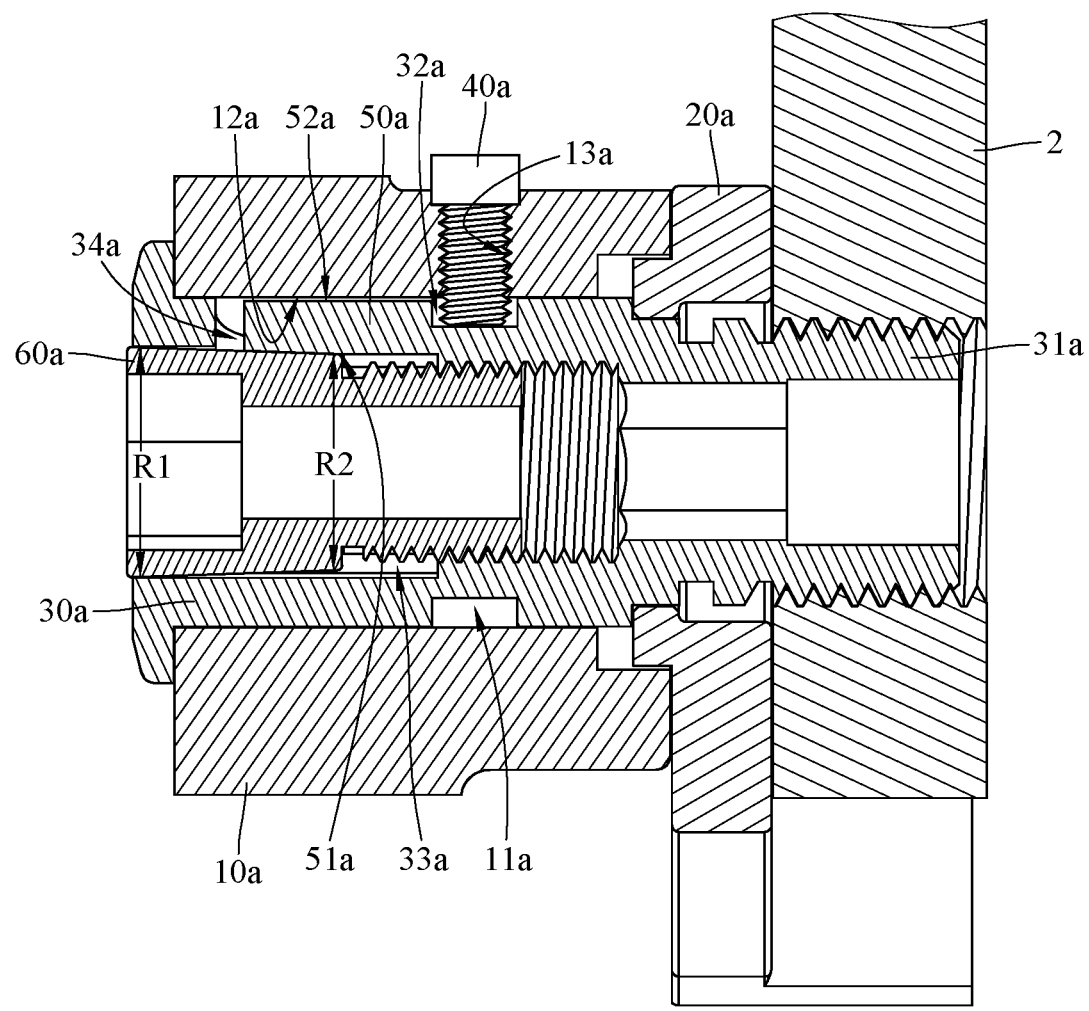
FIG. 3 is a partial enlarged cross-sectional view of the fixing assembly and the bicycle frame in FIG. 1.

Referring to FIGS. 1 to 3, FIG. 1 is a perspective view of a fixing assembly 1a and a bicycle frame 2 according to a first embodiment of the disclosure, FIG. 2 is an exploded view of the fixing assembly 1a and the bicycle frame 2 in FIG. 1, and FIG. 3 is a cross-sectional view of the fixing assembly 1a and the bicycle frame 2 in FIG. 1.

In this embodiment, the fixing assembly 1a includes a mount seat 10a, a gasket 20a, a fastener 30a, a positioning component 40a, a plurality of resistance applying components 50a, and a resistance controlling component 60a.

The mount seat 10a is the part of the bicycle rear derailleur configured to be mounted on the bicycle frame 2. The mount seat 10a has a through hole 11a, an annular inner surface 12a, and an insertion hole 13a. The annular inner surface 12a forms the through hole 11a. An extension direction of the insertion hole 13a is substantially perpendicular to that of the through hole 11a. The insertion hole 13a penetrates through the annular inner surface 12a and connects to the through hole 11a.

The gasket 20a is configured to be disposed on the bicycle frame 2. The fastener 30a has a threaded portion 31a. The fastener 30a is disposed through the through hole 11a of the mount seat 10a and the gasket 20a, and the threaded portion 31a of the fastener 30a is screwed into the bicycle frame 2 so that the gasket 20a and the mount seat 10a are fixed in position on the bicycle frame 2. In such a case, the gasket 20a is located between and clamped by the mount seat 10a and the bicycle frame 2, and the mount seat 10a is pivotable with respect to the gasket 20a.

The fastener 30a further has a positioning groove 32a, a recess 33a, and a plurality of openings 34a. The positioning component 40a is disposed through the insertion hole 13a of the mount seat 10a, and the positioning component 40a is partially located in the positioning groove 32a. As such, the cooperation of the positioning component 40a and the positioning groove 32a of the fastener 30a is able to position the fastener 30a. An extension direction of the recess 33a is substantially the same as that of the through hole 11a of the mount seat 10a. The openings 34a are connected to the recess 33a and located aside the annular inner surface 12a of the mount seat 10a.

The resistance applying components 50a and the fastener 30a are, for example, made of a single piece. That is, resistance applying components 50a are integrally formed on the fastener 30a. Specifically, as shown, the resistance applying component 50a is flexible and one end of the resistance applying component 50a is connected to the fastener 30a so that the resistance applying component 50a is movable with respect to the fastener 30a. Also, the resistance applying components 50a are respectively located at the openings 34a, and each of the resistance applying components 50a is located between the annular inner surface 12a and the recess 33a. In more detail, as shown in FIG. 3, each resistance applying components 50a has a first surface 51a facing towards the recess 33a and a second surface 52a facing away from the first surface 51a.

The resistance controlling component 60a is, for example, a hex socket cap screw in a tapered shape, and there are internal threads in the recess 33a of the fastener 30a. The resistance controlling component 60a is movably disposed in the recess 33a of the fastener 30a. The resistance controlling component 60a tapers towards the threaded portion 31a so that the outer diameter of the resistance controlling component 60a decreases towards the threaded portion 31a (e.g., R1 and R2 shown in FIG. 3).

Figure 4:
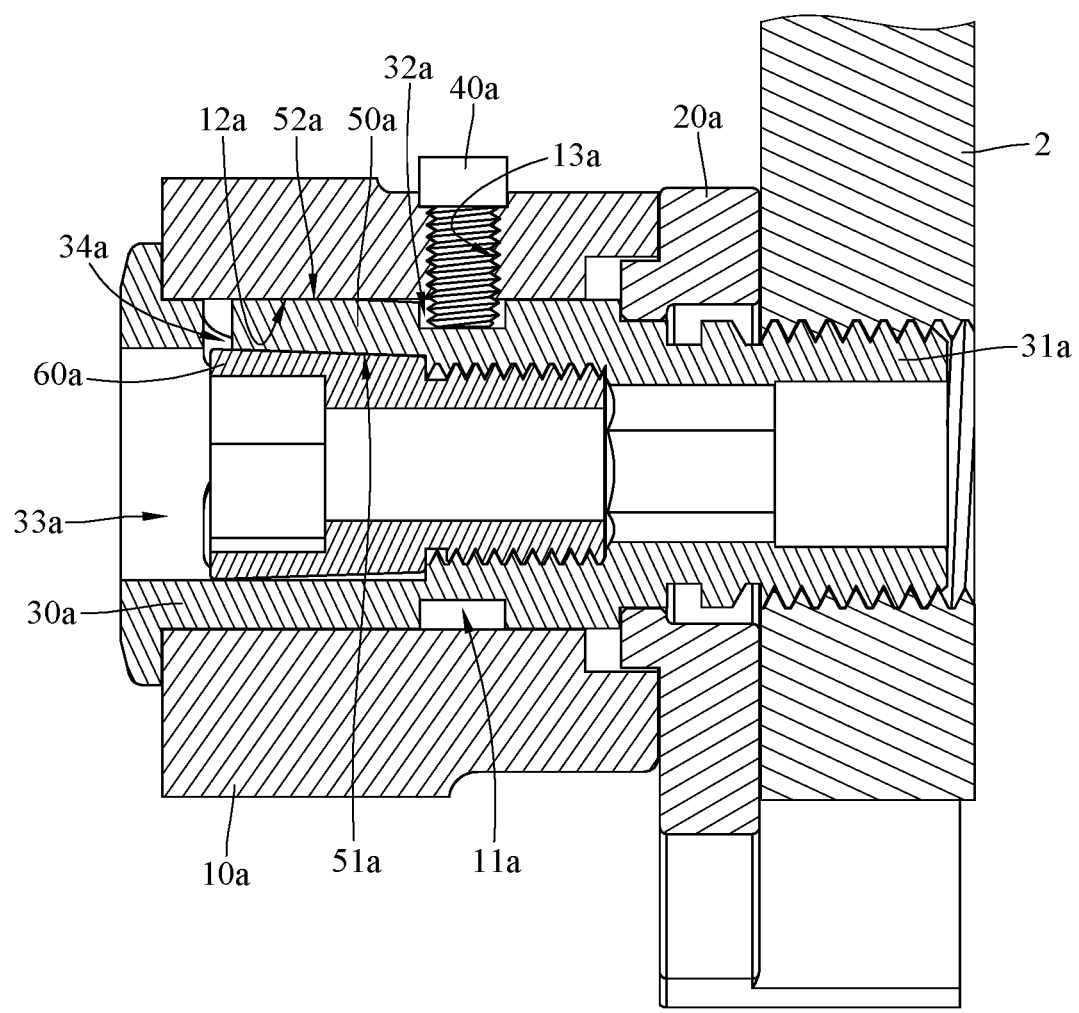
FIG. 4 is a partial enlarged cross-sectional view of the fixing assembly and the bicycle frame in FIG. 1 when resistance applying components press against an annular inner surface of a mount seat.

Then, referring FIG. 4, FIG. 4 is a cross-sectional view of the fixing assembly 1a and the bicycle frame 2 in FIG. 1 when the resistance applying components 50a press against the annular inner surface 12 of the mount seat 10.

The resistance controlling component 60a can be rotated and moved towards the threaded portion 31a of the fastener 30a along an axial direction of the fastener 30a by being driven by an ordinary hex key. During the movement of the resistance controlling component 60a, the wide portion of the resistance controlling component 60a gradually enters into the recess 33a and radially pushes outwards the resistance applying components 50a, such that the second surfaces 52a of the resistance applying components 50a tightly press against the annular inner surface 12a of the mount seat 10a. As a result, the resistance applying components 50a increase the rotational resistance of the mount seat 10a with respect to the bicycle frame 2. The increase of the rotational resistance is able to reduce the vibration or shaking of the bicycle rear derailleur while riding on a bumpy road, thereby preventing an unwanted gear shifting of the bicycle rear derailleur and preventing a bicycle chain from falling off from a bicycle rear cassette.

On the other hand, the resistance controlling component 60a can be reversely rotated to be moved away from the threaded portion 31a of the fastener 30a to reduce the resistance forces that the resistance applying components 50a apply on the mount seat 10a. By doing so, the bicycle rear derailleur becomes easier to pivot about the fastener 30a, and which facilitates the angle adjustment of the bicycle rear derailleur according to the rider's requirements and also facilitates the removal of the bicycle rear wheel.

In this embodiment, the quantity of the resistance applying components 50a on the fastener 30a is not restricted and may be modified according to actual requirements. In some other embodiments, the fixing assembly may have only one resistance applying component 50a.

Figure 5:
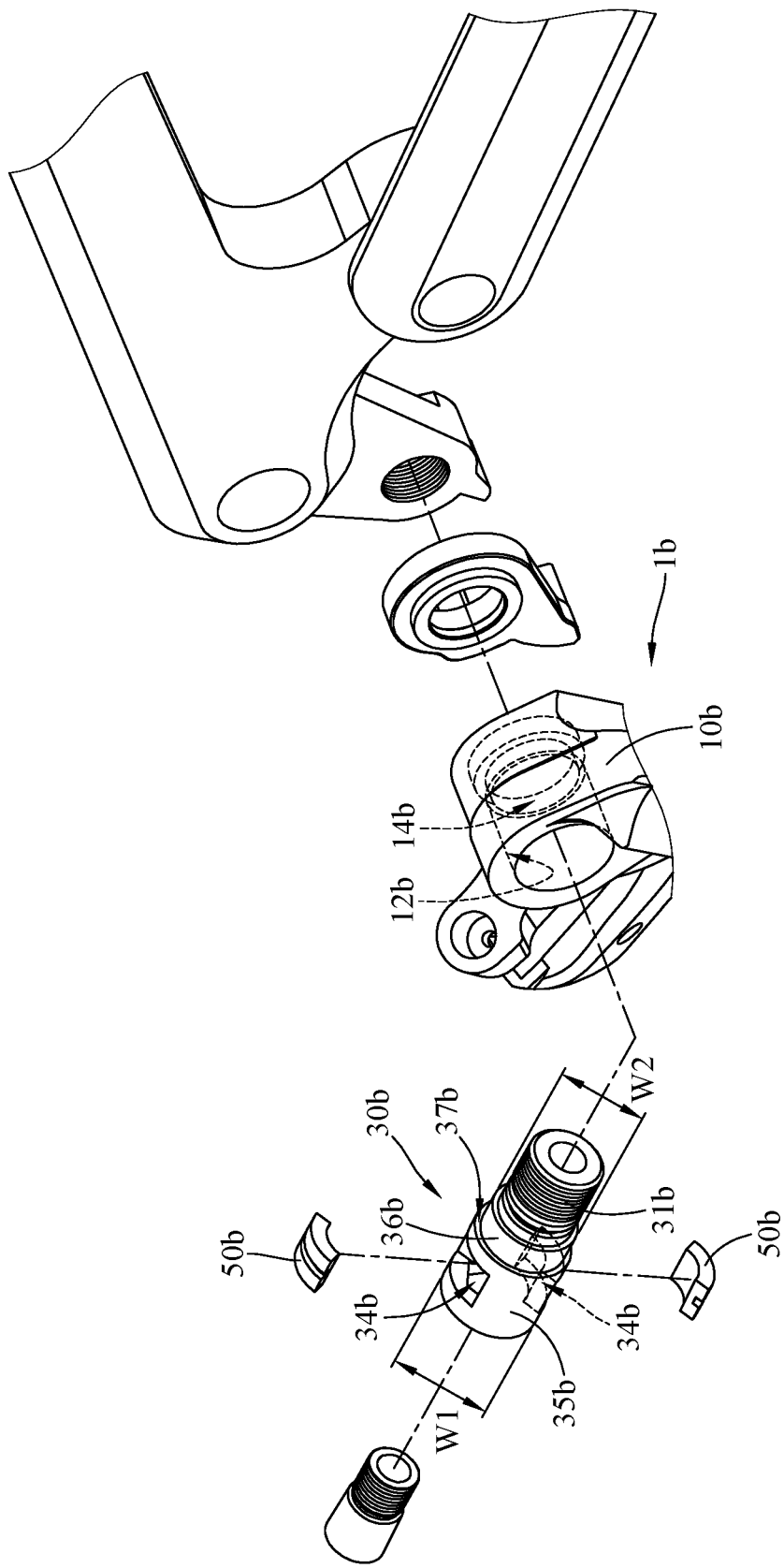
FIG. 5 is an exploded view of a fixing assembly and a bicycle frame according to a second embodiment of the disclosure.

In addition, the resistance applying component 50a and the fastener 30a are not restricted to be made of a single piece. For example, referring to FIG. 5, FIG. 5 is a an exploded view of a fixing assembly 1b and a bicycle frame 2 according to a second embodiment of the disclosure.

Note that the one of the main differences between the fixing assembly 1b and the fixing assembly 1a illustrated in the previous embodiments is the configuration of the resistance applying component and the fastener, thus only the differences will be illustrated below, and the same and similar parts will not be repeated.

In this embodiment, in the fixing assembly 1b, resistance applying components 50b and a fastener 30b are not made of a single piece; that is, the resistance applying components 50b and the fastener 30b are separate pieces, wherein the resistance applying components 50b are respectively detachably mounted at openings 34b of the fastener 30b.

In addition, a mount seat 10b of the fixing assembly 1b has a positioning structure 14b protruding from an annular inner surface 12b of the mount seat 10b. The fastener 30b includes a wide portion 35b and a narrow portion 36b coaxially connected to each other. A width W1 of the wide portion 35b is larger than a width W2 of the narrow portion 36b. A threaded portion 31b of the fastener 30b is located at the narrow portion 36b, and the openings 34b of the fastener 30b is located at the wide portion 35b. There is a rise 37b formed between the wide portion 35b and the narrow portion 36b. The rise 37b is configured to be in contact with the positioning structure 14b of the mount seat 10b. As such, the cooperation of the positioning structure 14b of the mount seat 10b and the rise 37b is able to position the fastener 30b.

Figure 6:
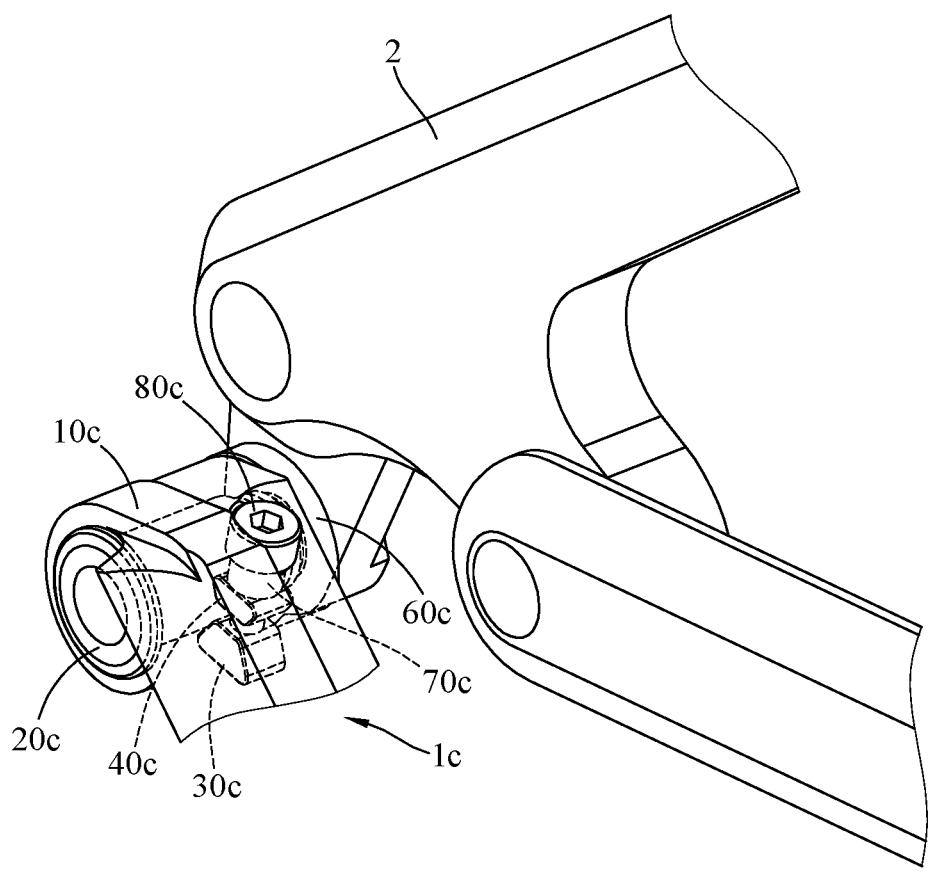
FIG. 6 is a partial enlarged perspective view of a fixing assembly and a bicycle frame according to a third embodiment of the disclosure.
Figure 7:
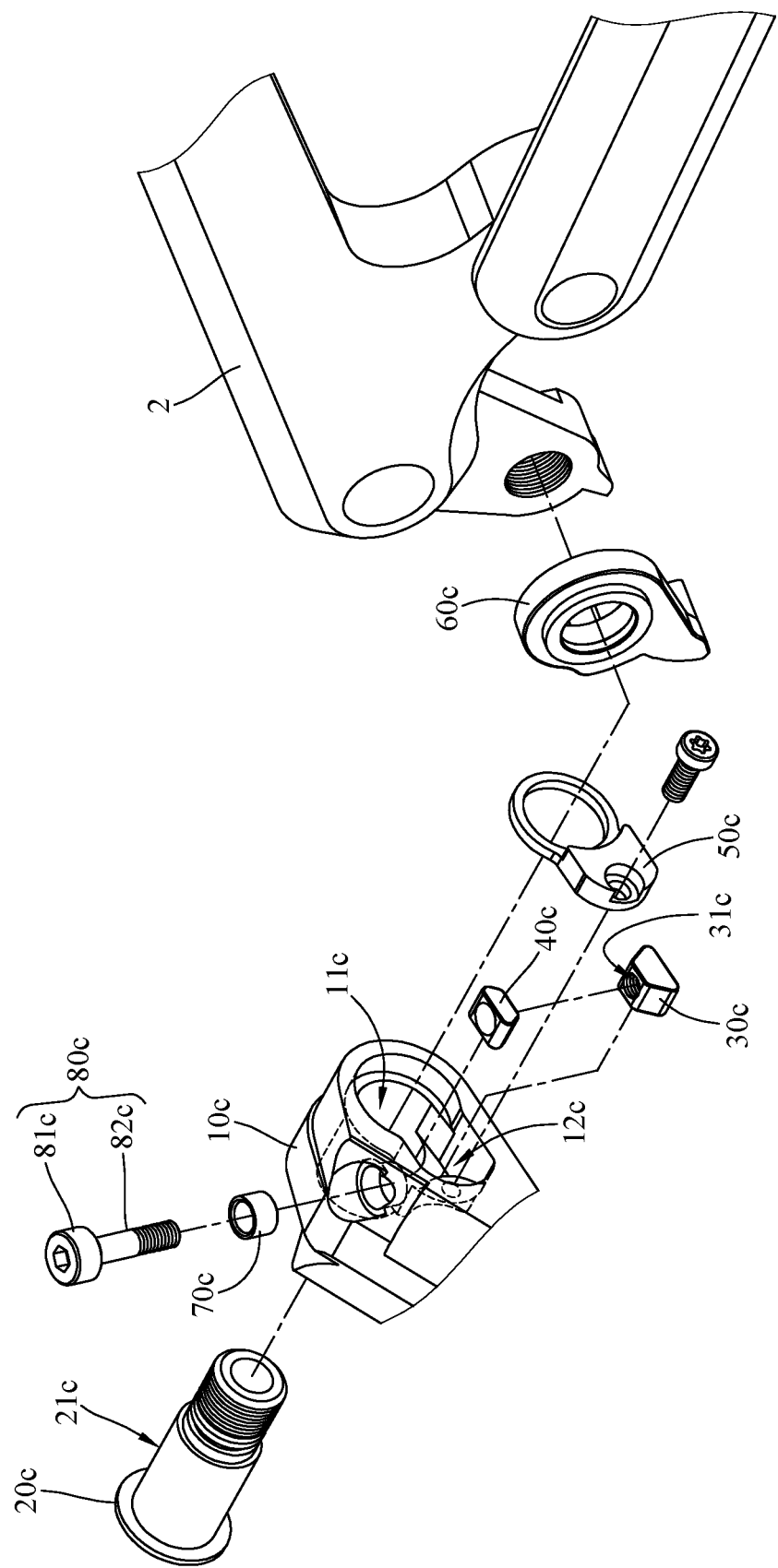
FIG. 7 is an exploded view of the fixing assembly and the bicycle frame in FIG. 6.
Figure 8:
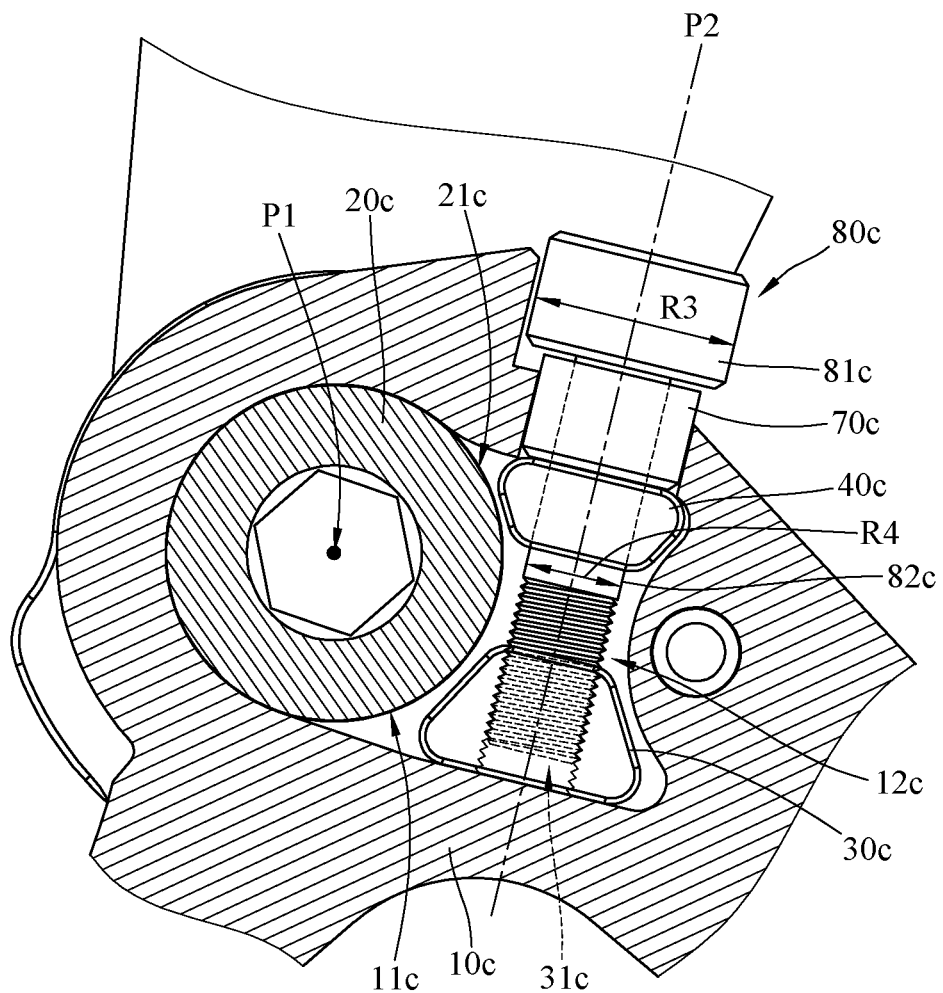
FIG. 8 is a partial enlarged cross-sectional view of the fixing assembly and the bicycle frame in FIG. 6.

Then, please refer to FIGS. 6 to 8 to introduce another embodiment of the disclosure, where FIG. 6 is a partial enlarged perspective view of a fixing assembly 1c and a bicycle frame 2 according to a third embodiment of the disclosure, FIG. 7 is an exploded view of the fixing assembly 1c and the bicycle frame 2 in FIG. 6, and FIG. 8 is a partial enlarged cross-sectional view of the fixing assembly 1c and the bicycle frame 2 in FIG. 6.

As shown, the fixing assembly 1c includes a mount seat 10c, a fastener 20c, a first resistance applying component 30c, a second resistance applying component 40c, a cover 50c, a gasket 60c, a contact component 70c and a resistance controlling component 80c.

The mount seat 10c has a through hole 11c and an accommodation space 12c connected to each other. A central line P1 of the through hole 11c does not penetrate through the accommodation space 12c. The fastener 20c has an outer surface 21c. The fastener 20c is disposed through the through hole 11c of the mount seat 10c. The fastener 20c is partially located at the accommodation space 12c, and another part of the fastener 20c is located outside the through hole 11c and the accommodation space 12c. The outer surface 21c of the fastener 20c is exposed from the accommodation space 12c. The first resistance applying component 30c and the second resistance applying component 40c are slidably located in the accommodation space 12c. The cover 50c is mounted on the mount seat 10c via, for example, fastener (not numbered). The cover 50c covers the first resistance applying component 30c and the second resistance applying component 40c. The portion of the fastener 20c, which is located outside the through hole 11c and the accommodation space 12c, is disposed through the cover 50c.

The gasket 60c is configured to be disposed on a bicycle frame 2. The portion of the fastener 20c, which is located outside the through hole 11c and the accommodation space 12c, is disposed through the gasket 60c and is configured to be screwed into the bicycle frame 2 so as to fix the gasket 60c and the mount seat 10c in position on the bicycle frame 2. In such a case, the gasket 60c is located between and clamped by the mount seat 10c and the bicycle frame 2, and the mount seat 10c is pivotable with respect to the gasket 60c.

The resistance controlling component 80c is, for example, a hex socket cap screw. The resistance controlling component 80c includes a head portion 81c and a threaded portion 82c coaxially connected to each other. An outer diameter R3 of the head portion 81c is larger than an outer diameter R4 of the threaded portion 82c. The contact component 70c is slidably sleeved on the threaded portion 82c. The threaded portion 82c is inserted into the mount seat 10c and is disposed through the second resistance applying component 40c, and the threaded portion 82c is partially located in the accommodation space 12c and covered by the cover 50c. The contact component 70c is located between the second resistance applying component 40c and the head portion 81c. In this embodiment, a rotation axis P2 of the resistance controlling component 80c is perpendicular to a central line of the fastener 20c (e.g., coaxial with the central line P1 of the through hole 11c). In addition, the first resistance applying component 30c has a screw hole 31c mating with the threaded portion 82c. The threaded portion 82c is partially screwed into the screw hole 31c.

Figure 9:
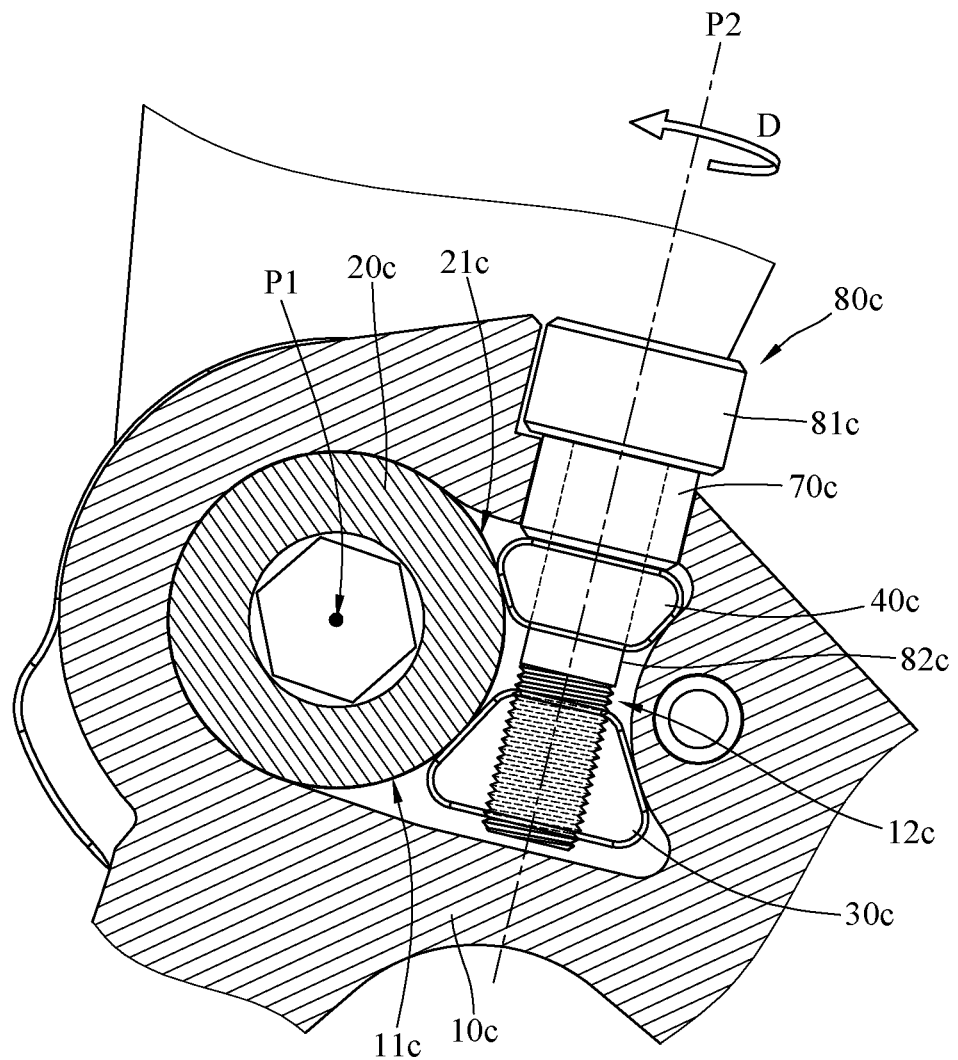
FIG. 9 is a partial enlarged cross-sectional view of the fixing assembly and the bicycle frame in FIG. 6 when a first resistance applying component presses against an outer surface of a fastener.

Then, referring to FIG. 9, FIG. 9 is a partial enlarged cross-sectional view of the fixing assembly 1c and the bicycle frame 2 in FIG. 6 when the first resistance applying component 30c presses against the outer surface 21c of the fastener 20c.

The head portion 81c of the resistance controlling component 80c can be rotated along a direction D by being driven by an ordinary hex key. During the rotation of the resistance controlling component 80c, the threaded portion 82c of the resistance controlling component 80c forces the first resistance applying component 30c and the second resistance applying component 40c to move towards each other. Then, the first resistance applying component 30c presses against the outer surface 21c of the fastener 20c, and the head portion 81c presses against the contact component 70c, such that the contact component 70c force the second resistance applying component 40c to press against the outer surface 21c of the fastener 20c. As a result, the first resistance applying component 30c and the second resistance applying component 40c together increase the rotational resistance of the mount seat 10a with respect to the bicycle frame 2. The increase of the rotational resistance is able to reduce the vibration or shaking of the bicycle rear derailleur while riding on a bumpy road, thereby preventing an unwanted gear shifting of the bicycle rear derailleur and a bicycle chain from falling off from a bicycle rear cassette.

Note that the contact component 70c is optional. In some other embodiments, the fixing assembly may have the contact component 70c; In such a case, the second resistance applying component can be directly forced by the head portion of the resistance controlling component to press against the outer surface of the fastener.

On the other hand, the resistance controlling component 80c can be reversely rotated to move the first resistance applying component 30c and the second resistance applying component 40c away from each other to reduce the resistance forces that the first resistance applying component 30c and the second resistance applying component 40c apply on the mount seat 10c. By doing so, the bicycle rear derailleur can be easily pivoted about the fastener 20c, and which facilitates the angle adjustment of the bicycle rear derailleur according to the rider's requirements and also facilitates the removal of the bicycle rear wheel.

Figure 10:
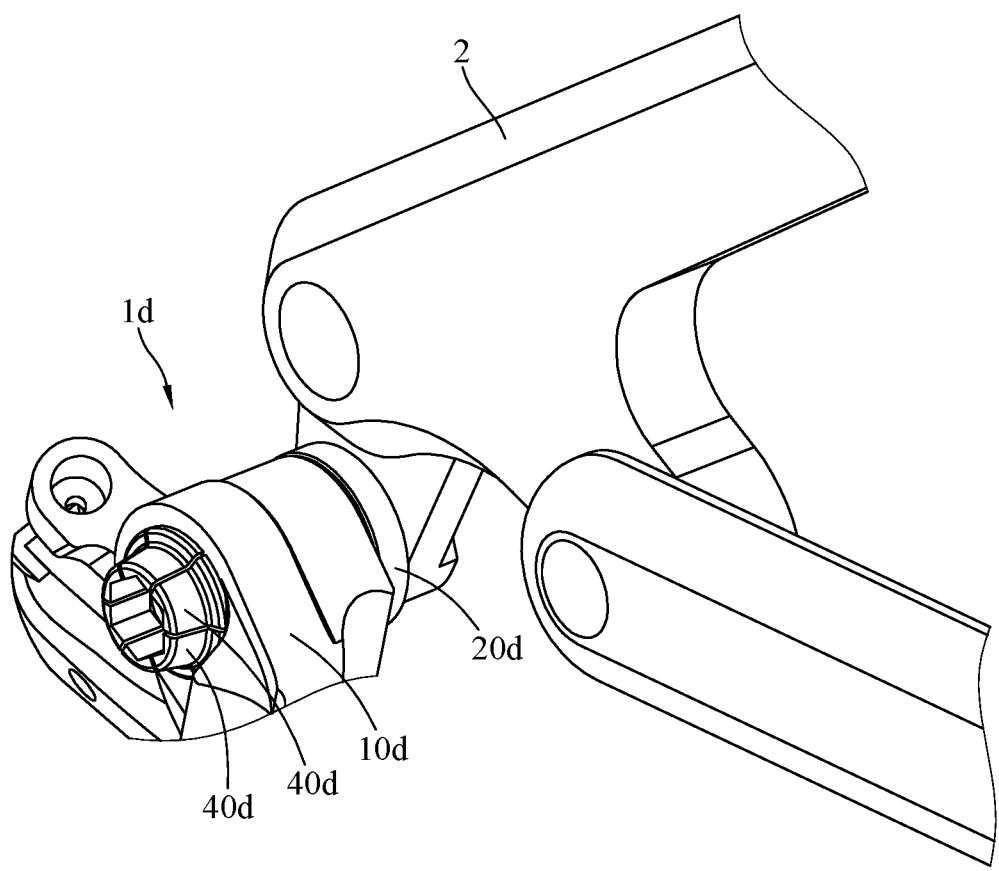
FIG. 10 is a partial enlarged perspective view of a fixing assembly and a bicycle frame according to a fourth embodiment of the disclosure.
Figure 11:
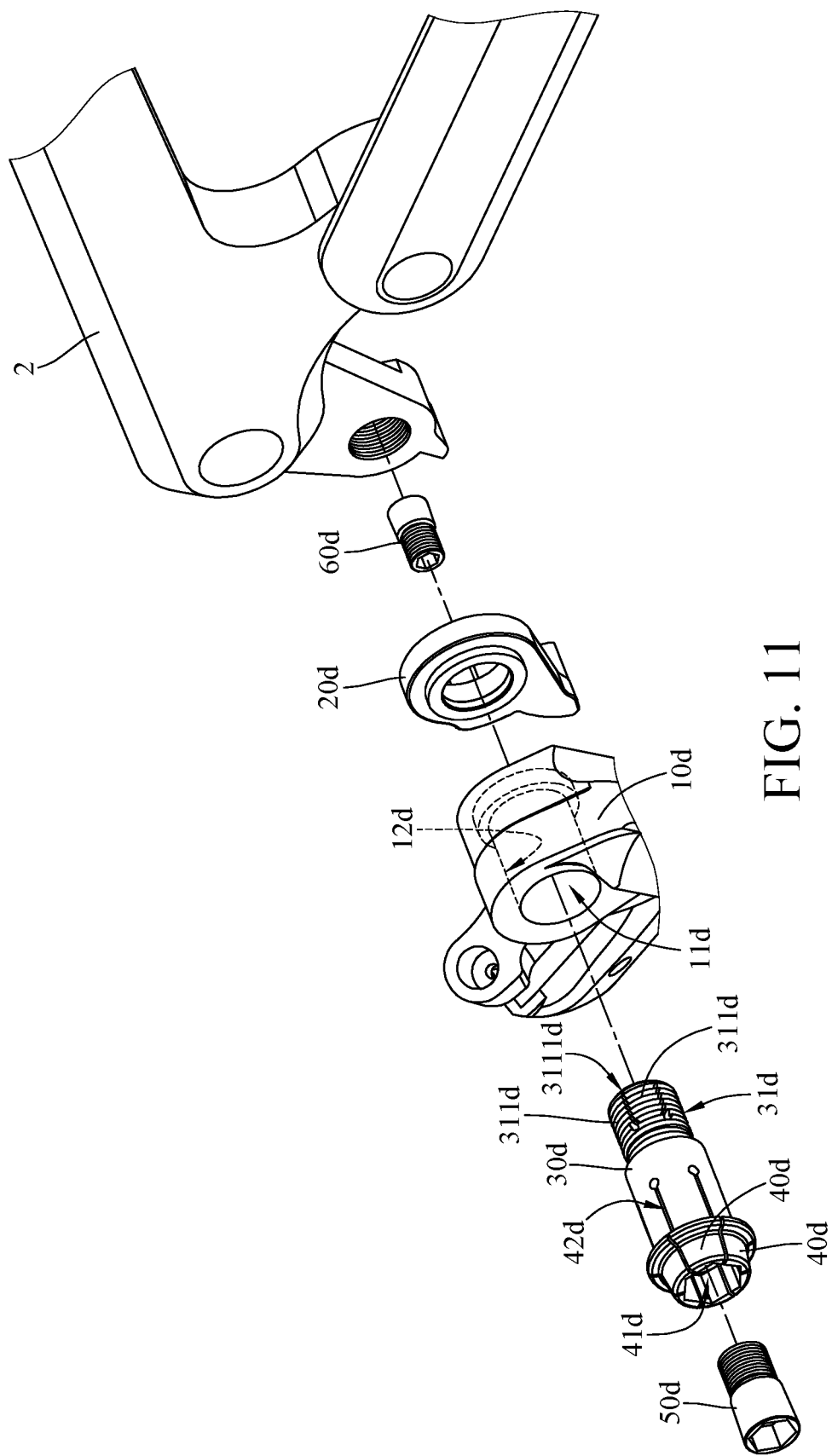
FIG. 11 is an exploded view of the fixing assembly and the bicycle frame in FIG. 10.
Figure 12:
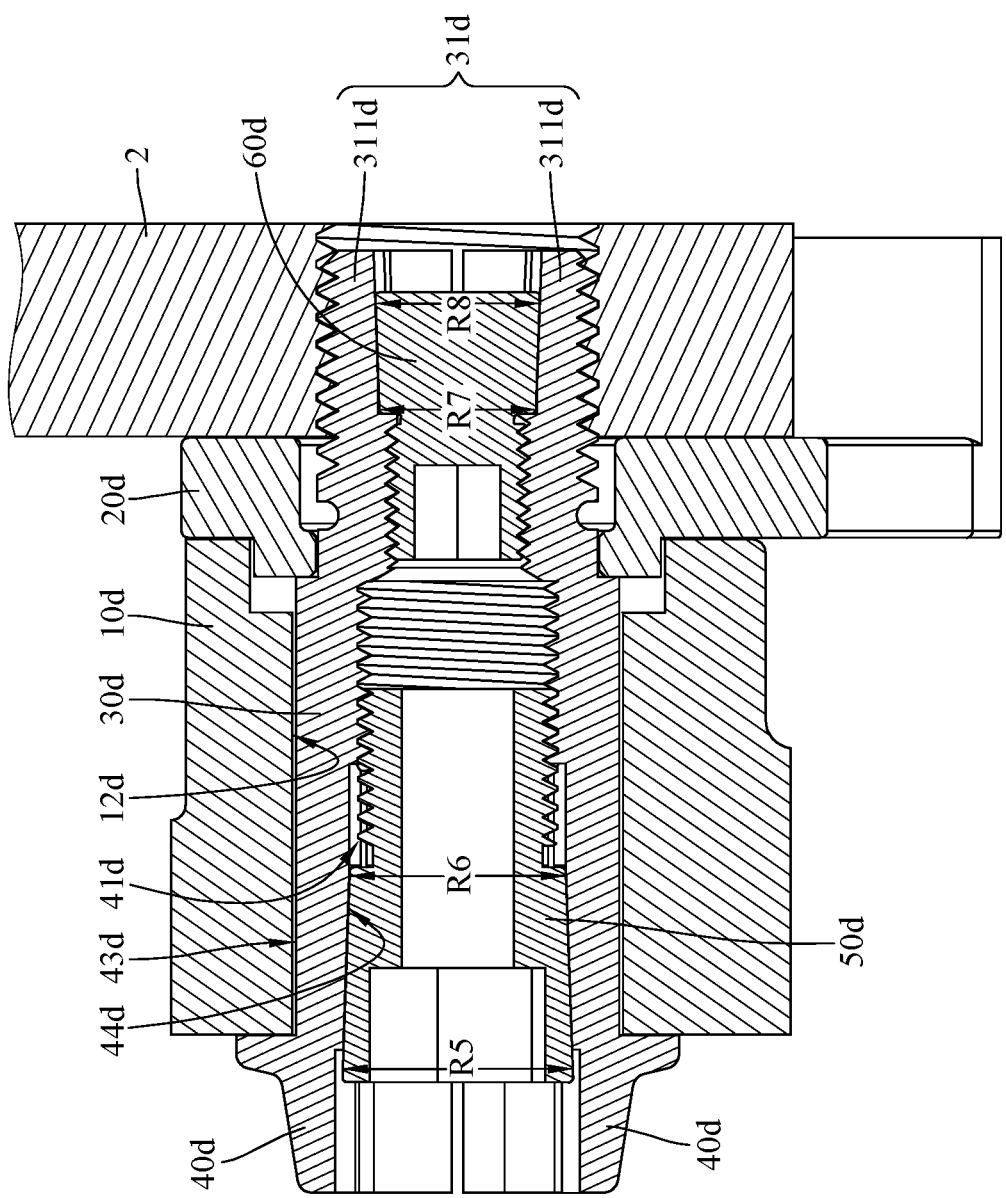
FIG. 12 is a partial enlarged cross-sectional view of the fixing assembly and the bicycle frame in FIG. 10.

Then, please refer to FIGS. 10 to 12 to introduce another embodiment of the disclosure. Referring to FIGS. 10 to 12, FIG. 10 is a partial enlarged perspective view of a fixing assembly 1d and a bicycle frame 2 according to a fourth embodiment of the disclosure, FIG. 11 is an exploded view of the fixing assembly 1d and the bicycle frame 2 in FIG. 10, and FIG. 12 is a partial enlarged cross-sectional view of the fixing assembly 1d and the bicycle frame 2 in FIG. 10.

In this embodiment, the fixing assembly includes a mount seat 10d, a gasket 20d, a fastener 30d, a plurality of resistance applying components 40d and a resistance controlling component 50d.

The mount seat 10d is the part of the bicycle rear derailleur which is configured to be mounted on the bicycle frame 2. The mount seat 10d has a through hole 11d and an annular inner surface 12d. The annular inner surface 12d forms the through hole 11d.

The gasket 20d is configured to be stacked on the bicycle frame 2. The fastener 30d has a threaded portion 31d. The fastener 30d is disposed through the through hole 11d of the mount seat 10d and the gasket 20d, and the threaded portion 31d of the fastener 30d is screwed into the bicycle frame 2 so that the gasket 20d and the mount seat 10d are fixed in position on the bicycle frame 2. In such a case, the gasket 20d is located between and clamped by the mount seat 10d and the bicycle frame 2, and the mount seat 10d is pivotable with respect to the gasket 20d.

The resistance applying components 40d and the fastener 30d are, for example, made of a single piece. The resistance applying components 40d are connected to another end of the fastener 30d, away from the threaded portion 31d, in an axial direction of the fastener 30d. That is, the resistance applying components 40d are integrally formed on the fastener 30d. Specifically, as shown, the resistance applying component 40d is flexible and one end of the resistance applying component 40d is connected to the fastener 30d so that the resistance applying component 40d is movable with respect to the fastener 30d. The resistance applying components 40d together form a recess 41d therebetween. The resistance applying components 40d are spaced apart from each other by a gap 42d extending along the axial direction of the fastener 30d. The resistance applying components 40d are located between the annular inner surface 12d of the mount seat 10d and the recess 41d. Each of the resistance applying components 40d has a first surface 43d facing the recess 41d and a second surface 44d facing away from the first surface 43d.

The resistance controlling component 50d is, for example, a hex socket cap screw in a tapered shape, and there are internal threads in the recess 41d. The resistance controlling component 50d is movably disposed in the recess 41d. The resistance controlling component 50d tapers towards the threaded portion 31d so that the outer diameter of the resistance controlling component 50d decreases towards the threaded portion 31d (e.g., R5 and R6 shown in FIG. 12).

Figure 13:
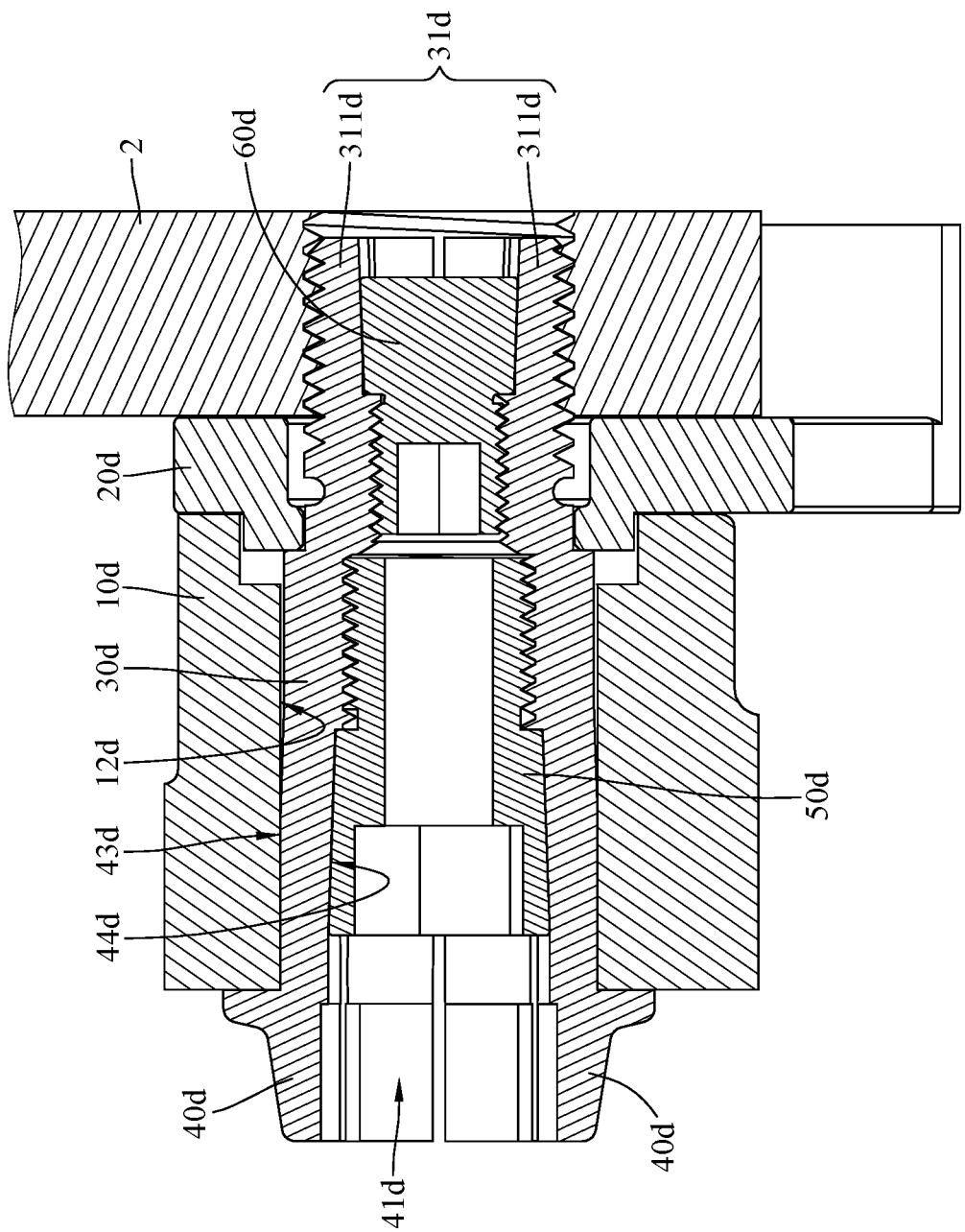
FIG. 13 is a partial enlarged cross-sectional view of the fixing assembly and the bicycle frame in FIG. 10 when resistance applying components press against an annular inner surface of a mount seat

Then, referring to FIG. 13, FIG. 13 is a partial enlarged cross-sectional view of the fixing assembly 1d and the bicycle frame 2 in FIG. 10 when the resistance applying components 40d press against the annular inner surface 12d of the mount seat 10d.

The resistance controlling component 50d can be rotated and moved towards the threaded portion 31d of the fastener 30d by being driven by an ordinary hex key. During the movement of the resistance controlling component 50d, the wide portion of the resistance controlling component 50d gradually enters into the recess 41d and radially push outwards the resistance applying components 40d, such that the second surfaces 42d of the resistance applying components 40d tightly press against the annular inner surface 12d of the mount seat 10d. As a result, the resistance applying components 40d increase the rotational resistance of the mount seat 10d with respect to the bicycle frame 2. The increase of the rotational resistance is able to reduce the vibration or shaking of the bicycle rear derailleur while riding on a bumpy road, thereby preventing an unwanted gear shifting of the bicycle rear derailleur and a bicycle chain from falling off from a bicycle rear cassette.

On the other hand, the resistance controlling component 50d can be reversely rotated to be move away from the threaded portion 31d of the fastener 30d to reduce the resistance forces that the resistance applying components 40d apply on the mount seat 10d. By doing so, the bicycle rear derailleur become easier to pivot about the fastener 30d, and which facilitates the angle adjustment of the bicycle rear derailleur according to the rider's requirements and also facilitates the removal of the bicycle rear wheel.

In this embodiment, the fixing assembly 1d further includes a press component 60d, and the threaded portion 31d of the fastener 30d includes a plurality of elastic parts 311d. Two of the elastic part 311d, adjacent to each other, are space apart from each other by a gap 3111d extending along the axial direction of the fastener 30d. The press component 60d is, for example, a hex socket cap screw in a tapered shape. The press component 60d is screwed into the threaded portion 31d along the axial direction of the fastener 30d. The press component 60d tapers towards the resistance controlling component 50d so that the outer diameter of the press component 60d decreases towards resistance controlling component 50d (e.g., R7 and R8 shown in FIG. 12). The wide portion of the press component 60d presses against the elastic parts 311d, such that the elastic parts 311d tightly press against the bicycle frame 2. As such, the fixing strength of the fastener 30d on the bicycle frame 2 can be increased, thus it prevents the fastener 30d from being screwed out from the bicycle frame 2 while the resistance controlling component 50d is screwed and moved away from the threaded portion 31d of the fastener 30d.

According to the fixing assemblies as discussed above, the movement or rotation of the resistance controlling component can force the resistance applying components to press against the annular inner surface of the mount seat or the outer surface of the fastener, such that the resistance applying components increase the rotational resistance of the mount seat. As a result, the vibration or shaking of the bicycle rear derailleur can be reduced while riding on a bumpy road, thereby preventing an unwanted gear shifting of the bicycle rear derailleur and preventing a bicycle chain from falling off from a bicycle rear cassette.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fixing assembly for a bicycle rear derailleur, configured to be mounted on a bicycle frame, comprising:

a mount seat, having a through hole and an annular inner surface forming the through hole;
a fastener, disposed through the through hole of the mount seat, wherein the fastener has a threaded portion and a recess, the threaded portion is configured to be screwed into the bicycle frame to fix the mount seat on the bicycle frame, and the recess of the fastener and the through hole of the mount seat extend along a same direction;
at least one resistance applying component, movably disposed on the fastener and located between the annular inner surface of the mount seat and the recess of the fastener; and
a resistance controlling component, movably disposed on the recess of the fastener, wherein the resistance controlling component is movable towards the threaded portion of the fastener along an axial direction of the fastener so as to force the resistance applying component to radially move outwards to press against the annular inner surface of the mount seat.

2. The fixing assembly according to claim 1, wherein the fastener has at least one opening connected to the recess, the at least one opening is located aside the annular inner surface of the mount seat, and the at least one resistance applying component is located at the at least one opening of the fastener.

3. The fixing assembly according to claim 1, wherein the at least one resistance applying component has a first surface and a second surface, the first surface faces towards the recess, the second surface faces away from the first surface, the resistance controlling component is in a tapered shape, the resistance controlling component tapers towards the threaded portion of the fastener; when the resistance controlling component is moved towards the threaded portion along the axial direction of the fastener, the resistance controlling component presses against the first surface of the at least one resistance applying component to force the second surface of the at least one resistance applying component to press against the annular inner surface of the mount seat.

4. The fixing assembly according to claim 1, further comprising a positioning component, wherein the mount seat has an insertion hole, the insertion hole extends along a direction perpendicular to the direction that the through hole extends, the fastener has a positioning groove, the positioning component is disposed through the insertion hole of the mount seat and is partially located in the positioning groove of the fastener.

5. The fixing assembly according to claim 1, wherein the mount seat has a positioning structure, the positioning structure protrudes from the annular inner surface of the mount seat, the fastener comprises a wide portion and a narrow portion coaxially connected to each other, the wide portion are wider than the narrow portion, the threaded portion is located at the narrow portion, there is a rise formed between the wide portion and the narrow portion, and the rise is in contact with the positioning structure.

6. The fixing assembly according to claim 1, wherein the at least one resistance applying component and the fastener are made of a single piece.

7. The fixing assembly according to claim 1, wherein the at least one resistance applying component and the fastener are separate pieces.

8. The fixing assembly according to claim 1, further comprising a gasket, wherein the gasket is configured to be fixed on the bicycle frame and located between the mount seat and the bicycle frame, the threaded portion of the fastener is disposed through the gasket, and the mount seat is pivotable with respect to the gasket.

9. A fixing assembly for a bicycle rear derailleur, configured to be mounted on a bicycle frame, comprising:
a mount seat;
a fastener, disposed through the mount seat, wherein an end of the fastener is configured to be screwed into the bicycle frame to fix the mount seat on the bicycle frame, the fastener has an outer surface;
a first resistance applying component, movably disposed on the mount seat, wherein the first resistance applying component has a screw hole; and
a resistance controlling component, disposed through the mount seat, wherein the resistance controlling component comprises a threaded portion mating with the screw hole, and the resistance controlling component is rotatable to move the first resistance applying component to press against the outer surface of the fastener or away from the outer surface of the fastener.

10. The fixing assembly according to claim 9, wherein a rotation axis of the resistance controlling component is perpendicular to a central line of the fastener.

11. The fixing assembly according to the claim 9, further comprising a second resistance applying component, wherein the second resistance applying component is slidably disposed on the mount seat, the threaded portion is disposed through the second resistance applying component, the resistance controlling component is rotatable to force the first resistance applying component and the second resistance applying component to move towards each other to press against the outer surface of the fastener, or to be away from each other.

12. The fixing assembly according to the claim 11, further comprising a contact component, wherein the resistance controlling component further comprises a head portion, the head portion and the threaded portion are coaxially connected to each other, the head portion are wider than the threaded portion, the contact component is slidably sleeved on the threaded portion and is located between the second resistance applying component and the head portion.

13. The fixing assembly according to the claim 11, further comprising a cover, wherein the mount seat has an accommodation space, a part of the fastener, the first resistance applying component, the second resistance applying component and the threaded portion are located in the accommodation space, another part of the fastener is located outside the accommodation space, the cover is mounted on the mount seat and covers the first resistance applying component, the second resistance applying component and the threaded portion, the part of the fastener located outside the accommodation space is disposed though the cover.

14. The fixing assembly according to claim 13, wherein the cover is fixed on the mount seat via another fastener.

15. The fixing assembly according to claim 9, further comprising a gasket, wherein the gasket is configured to be fixed on the bicycle frame and located between the mount seat and the bicycle frame, an end of the fastener is disposed through the gasket, and the mount seat is pivotable with respect to the gasket.

16. A fixing assembly for a bicycle rear derailleur, configured to be mounted on a bicycle frame, comprising:
a mount seat, having a through hole and an annular inner surface forming the through hole;
a fastener, disposed through the through hole of the mount seat, wherein the fastener has a threaded portion, and the threaded portion is configured to be screwed into the bicycle frame to fix the mount seat on the bicycle frame;

a plurality of resistance applying components, connected to an end of the fastener, away from the threaded portion of the fastener, in an axial direction of the fastener, wherein the plurality of the resistance applying components together form a recess therebetween, and the plurality of resistance applying components are located between the annular inner surface of the mount seat and the recess; and a resistance controlling component, movably disposed in the recess, wherein the resistance controlling component is movable towards the threaded portion of the fastener along the axial direction of the fastener so as to force the plurality of resistance applying components to radially move outwards to press against the annular inner surface of the mount seat.

17. The fixing assembly according to claim 16, wherein two of the plurality of the resistance applying components, adjacent to each other, are spaced apart from each other by a gap extending along the axial direction of the fastener.

18. The fixing assembly according to claim 16, wherein each of the plurality of resistance applying components has a first surface facing the recess and a second surface facing away from the first surface, the resistance controlling component is in a tapered shape, the resistance controlling component tapers towards the threaded portion of the fastener; when the resistance controlling component is moved towards the threaded portion along the axial direction of the fastener, the resistance controlling component presses against the first surfaces of the plurality of resistance applying components to force the second surfaces of the plurality of resistance applying components to press against the annular inner surface of the mount seat.

19. The fixing assembly according to claim 16, further comprising a press component, wherein the threaded portion comprises a plurality of elastic parts, two of the plurality of elastic parts, adjacent to each other, are space apart from each other by a gap, the press component presses against the plurality of elastic parts for forcing the plurality of elastic parts to press against the bicycle frame.

20. The fixing assembly according to claim 19, wherein the press component is in a tapered shape, the press component tapers towards the resistance controlling component, and a portion of the press component away from the resistance controlling component presses against the plurality of elastic parts.

21. The fixing assembly according to claim 16, wherein the plurality of the resistance applying components and the fastener are made of a single piece.

22. The fixing assembly according to claim 16, further comprising a gasket, wherein the gasket is configured to be fixed on the bicycle frame and located between the mount seat and the bicycle frame, the threaded portion of the fastener is disposed through the gasket, the mount seat is pivotable with respect to the gasket.

* * * * *